United States Patent
Dunn et al.

(10) Patent No.: US 7,495,714 B2
(45) Date of Patent: Feb. 24, 2009

(54) FLAT PANEL DISPLAY HAVING AN ISOLATED EMI LAYER AND INTEGRAL HEATER AND THERMAL SENSORS

(75) Inventors: William R. Dunn, Alpharetta, GA (US); Keuk-Sang Kwon, Chilgok-gun (KR); Hyoung Yol Park, Kumi (KR)

(73) Assignee: American Panel Corporation, Alpharetta, GA (US)

( * ) Notice: Subject to any disclaimer, the term of this patent is extended or adjusted under 35 U.S.C. 154(b) by 483 days.

(21) Appl. No.: 10/679,977

(22) Filed: Oct. 7, 2003
(Under 37 CFR 1.47)

(65) Prior Publication Data
US 2005/0105009 A1 May 19, 2005

(51) Int. Cl.
*G02F 1/133* (2006.01)

(52) U.S. Cl. .............. 349/21; 349/20; 349/43; 349/72; 349/199

(58) Field of Classification Search ........... 349/161, 349/162, 72, 101, 110, 111, 177, 21, 20, 349/43, 199
See application file for complete search history.

(56) References Cited

U.S. PATENT DOCUMENTS

| | | | | |
|---|---|---|---|---|
| 4,593,978 A | * | 6/1986 | Mourey et al. | 349/21 |
| 4,634,225 A | * | 1/1987 | Haim et al. | 349/161 |
| 5,247,374 A | * | 9/1993 | Terada | 349/161 |
| 5,467,085 A | | 11/1995 | Dunn | 340/971 |
| 5,559,614 A | * | 9/1996 | Urbish et al. | 349/21 |
| 5,736,922 A | | 4/1998 | Goode, III et al. | 340/974 |
| 5,805,117 A | | 9/1998 | Mazurek et al. | 345/1 |
| 5,818,010 A | | 10/1998 | McCann | |
| 5,896,098 A | | 4/1999 | Goode, III et al. | 340/474 |
| 6,067,062 A | * | 5/2000 | Takasu et al. | 345/87 |
| 6,089,751 A | | 7/2000 | Conover et al. | |
| 6,157,432 A | * | 12/2000 | Helbing | 349/172 |
| 6,249,329 B1 | | 6/2001 | Dabral et al. | 349/73 |
| 6,341,879 B1 | | 1/2002 | Skinner et al. | 362/295 |
| 6,417,900 B1 | * | 7/2002 | Shin et al. | 349/110 |
| 6,628,355 B1 | | 9/2003 | Takahara | |
| 6,774,883 B1 | * | 8/2004 | Muhlemann | 345/101 |
| 6,839,104 B2 | * | 1/2005 | Taniguchi et al. | 349/106 |
| 6,885,412 B2 | * | 4/2005 | Ohnishi et al. | 349/72 |
| 2002/0067391 A1 | * | 6/2002 | Anagnostopoulos et al. | 347/40 |
| 2004/0036834 A1 | * | 2/2004 | Ohnishi et al. | 349/177 |

OTHER PUBLICATIONS

Krusius et al., Seamless Tiling of AMLCDs for Large Area Displays, Rainbow Displays, Inc., SID 02 Digest, Oct. 2, 2002, 6 pp.
Greene, R. G. et al., Seamless Tiling Technology for Large Direct-View Color AMLCD's, SID 00 Digest, Oct. 2, 2002, 3 pp.
http://tftlcd.kyunghee.ac.kr/research/poly-Si/chapter1.html , Chapter 1 Introduction, Basic Concept of TFT-LCD, Oct. 2, 2002, 8 pp.

* cited by examiner

*Primary Examiner*—David C. Nelms
*Assistant Examiner*—Thanh-Nhan P Nguyen
(74) *Attorney, Agent, or Firm*—Standley Law Group LLP

(57) ABSTRACT

A flat panel display having a black mask EMI layer isolated from Vcom and tied to zero potential. The flat panel display has a integral metal heater layer and thermal sensor that are in close proximity to the liquid crystals to provide efficient heating and temperature sensing.

14 Claims, 16 Drawing Sheets

Current TFT Design

FLAT PANEL DISPLAY HAVING AN ISOLATED EMI LAYER AND INTEGRAL HEATER AND THERMAL SENSORS

BACKGROUND AND SUMMARY OF THE INVENTION

The present invention relates to a liquid crystal flat panel display. More particularly, in one embodiment, the flat panel display of the present invention has layers of Indium Tin Oxide (ITO), or other optically transparent electrically conductive materials, coated on the front and rear external glass surfaces under the front and rear polarizers. The ITO layer at the front of the display acts as an EMI filter. The ITO layer at the back of the display is used as a heater. Each ITO layer may or may not be overcoated on one or both sides with index matching dielectrics to improve optical transmission through the ITO coatings, and/or reduce the optical reflections at the front and/or rear surfaces of the ITO layers.

In an alternative embodiment, the ITO heater layer is placed on the inside surface of the glass plate allowing the ITO heater layer to be closer to the liquid crystal layer. This reduces the thermal resistance between the ITO layer and the liquid crystal layer thus reducing the amount of power necessary to heat the liquid crystal layer. In this embodiment, it is preferred that the black mask or mesh layer, preferably comprised of black chrome, be electrically tied to the chassis. The chassis is at zero potential, thus the black mask acts as an EMI layer. In the preferred embodiment, bus bars are placed along predetermined edges of the ITO heater layer. The bus bars allow for the uniform injection of current into the ITO heater layer. It is also preferred that thermal sensors be placed on the inside portion of the glass and in close proximity to the ITO layer to detect the heat being inputted into the liquid crystal layer.

In another alternative embodiment, an integral metal heater is used instead of the ITO heater layer. The metal heater is applied to the TFT layer and is in close proximity to the liquid crystal layer to provide improved and efficient heating capabilities.

In the another alternate embodiment, a black mask EMI layer is interposed between the front and back glass plates. In the preferred embodiment, the EMI layer is isolated from Vcom and tied to zero potential. It is preferred that the integral metal heater be placed behind the black mask EMI layer so that no portion of the heater is visible and no portion of the heater interferes with the pixel apertures.

In another alternate embodiment, integral thermal sensors may also be layered onto the TFT array layer preferably under the black mask EMI layer. In this embodiment, thermal resistivity is reduced leading to faster response times. It is appreciated, as discussed in further detail below, that features of the alternate embodiments discussed above may be combined to form additional alternative flat panel display designs. For example, a flat panel display may be configured with all of the inventions of the isolated black mask EMI layer, integral thermal sensor and integral heater combined in one flat panel display.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
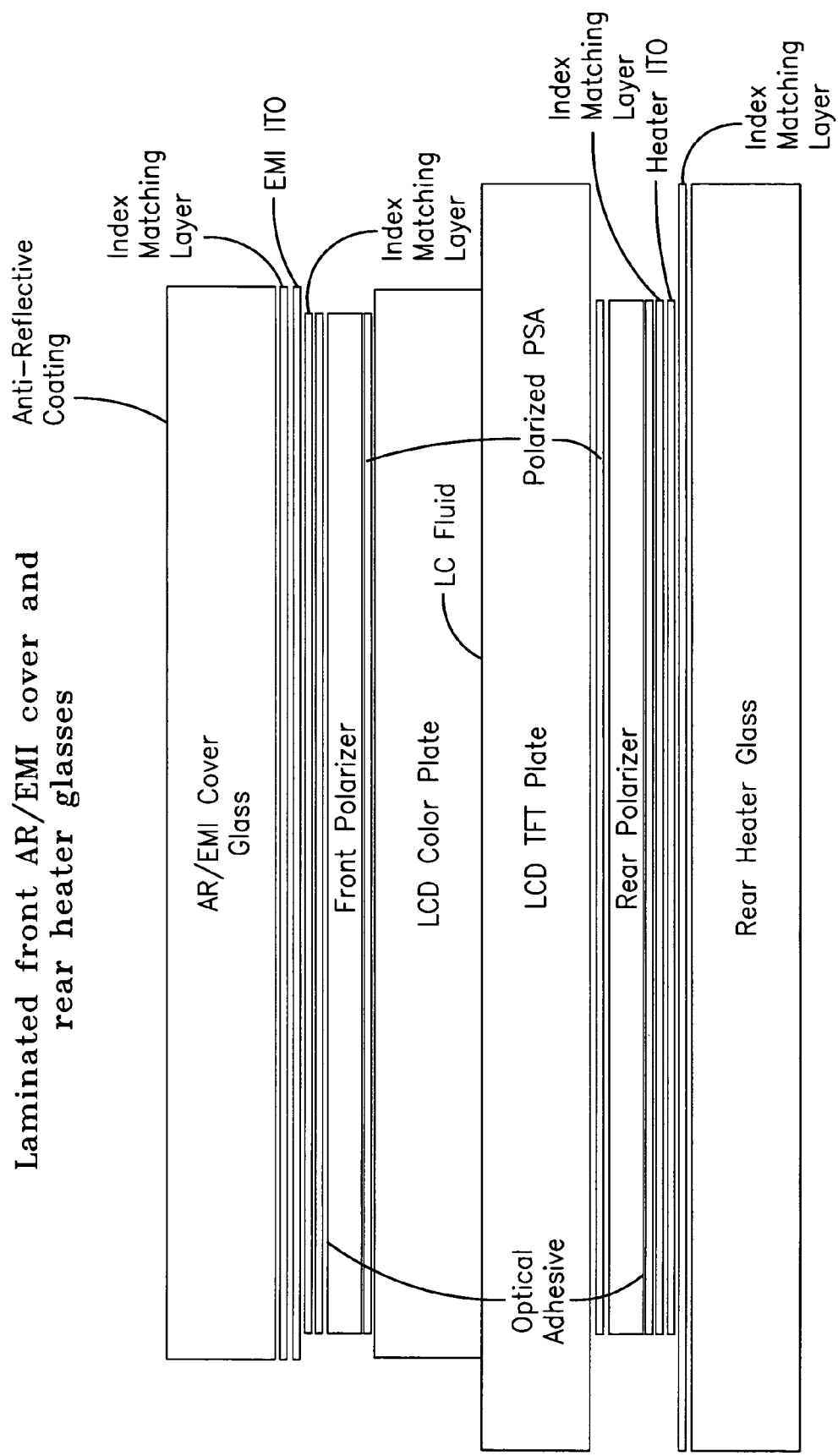
FIG. 1 illustrates a known flat panel display system.
Figure 2:
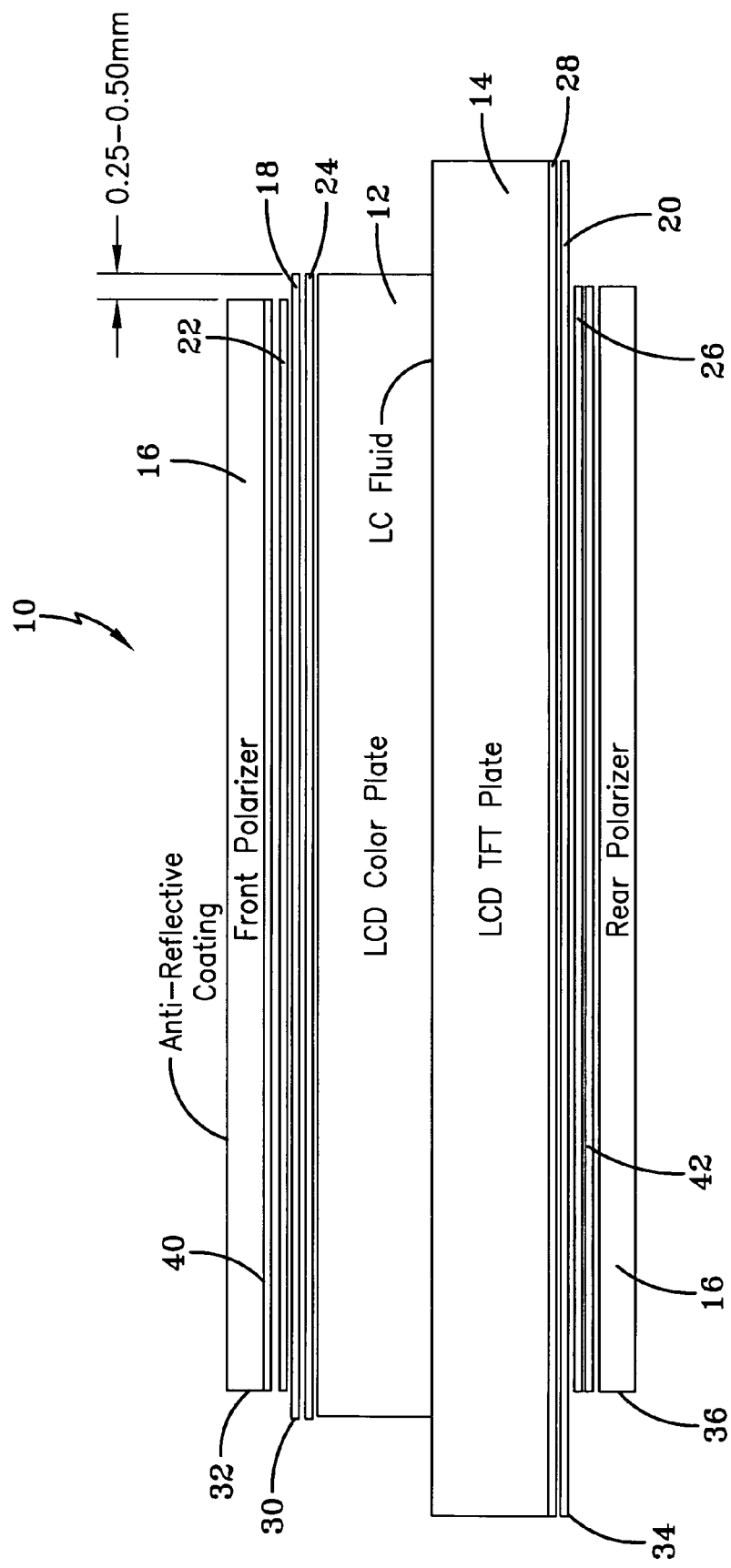
FIG. 2 illustrates a one embodiment of the flat panel display of the present invention.

FIG. 1 illustrates a known display system. In known flat panel displays, the polarizer layers are placed directly on the front and back plates. FIG. 2 illustrates one embodiment of the flat panel display 10 of the present invention. According to known flat panel display technology, the display is comprised of a front plate 12 and a back plate 14. In one embodiment of the present invention, layers of Indium Tin Oxide (ITO) layers 18, 20 (with or without additional index of refraction matching dielectric layers) are placed between the outside surfaces of the front and back plates and the polarizer layers 16. In one embodiment, the front plate is a liquid crystal display (LCD) color filter (CF) plate and the back plate is an LCD thin film transistor (TFT) plate. In one embodiment the front and back plates are transparent glass substrates. According to known principles, a layer or coating of liquid crystals are placed between the plates.

In the embodiment of FIG. 2, the front ITO coating 18 is preferably a constant 15-20 ohms/sq value. A first index matching dielectric layer 22 may be placed between the ITO layer and the front polarizer layer. A second index matching dielectric layer 24 may be placed between the ITO layer and the front plate. When electrically bonded or grounded to the associated metal or electrically conductive chassis of the complete LCD assembly and/or its associated product chassis, this front ITO coating acts as an electromagnetic interference (EMI) shield. This ITO EMI shield significantly reduces radiated emissions originating from the LCD itself, as well as shields, or reduces the susceptibility of, the LCD from the effects of externally imposed electro-magnetic fields.

In the embodiment of FIG. 2, the rear ITO coating 20 is preferably sandwiched between a first index matching dielectric layer 26 and a second index matching dielectric layer 28. The first index matching dielectric layer 26 may be placed between the ITO layer and the rear polarizer layer. The second index matching dielectric layer 28 may be placed between the ITO layer and the back plate. The index matching layers are for matching the index of refraction between the ITO layer and the glass and between the ITO layer and the Pressure Sensitive Adhesive (PSA) layers 40, 42 of the polarizer, respectively. Index matching helps keep the specular reflection to an absolute minimum, which also increases the optical transmission of the entire optical stack. The rear ITO layer is actively driven by circuitry to function as a heater. The ohm/sq value of this ITO layer may vary as desired based on performance needs and size variables.

In the preferred embodiment of FIG. 2, the outer edges 30 of the front ITO layer and the front plate extend past (e.g., 0.25-0.50 mm) the outer edges 32 of the front polarizer and first dielectric layer (if present) 18. This exposes the front ITO layer for electrical contact outboard of the polarizer edges. Similarly, two opposed outer edges 34 of the back ITO layer and the back plate extend past the outer edges 36 of the back polarizer layer and the dielectric layer (if present) 20. Thus the ITO layer is exposed for connection of the drive circuitry for the heater function.

Placing the ITO layers and the index matching layers between the polarizers and the plates provides advantages over known flat panel displays (i.e., current known processes apply the coatings on separate glass plates (not directly on the LCD plates). The separate front EMI plate can be mounted free standing in front of the LCD or laminated with optical adhesive directly to the front polarizer of the LCD. The separate rear heater plate is laminated with optical adhesive directly to either the front or rear polarizer of the LCD in order to facilitate adequate heat transfer from the ITO heating layer to the liquid crystal fluid. In some known configurations, the heater ITO is decoupled (radio frequency (RF)) to the chassis ground of the LCD, so that it functions as both the EMI shield and the heater. In these cases, the heater element is typically laminated to the front polarizer of the LCD.

Placing the ITO layers, with or without index matching layers, directly on the plates results in significant cost, weight, and thickness savings, as well as improved optical performance. The process embodied in this invention also provides a more efficient coupling of the heater ITO to LCD fluid, reducing the power density required to heat the LCD fluid to a given temperature over a given period of time. This improved coupling results from having the ITO heater coated directly on the surface of the LCD glass, thereby eliminating the thermal resistance caused in known implementations by the optical adhesive, polarizer and polarizer PSA. In typical known configurations, a power density of 2 watts per square inch of display image area is required to heat the LCD fluid from −54° C. to −20° C. in ≦10 minutes. With the ITO coated directly on the rear surface of the LCD, this same heating of the LCD fluid can be accomplished with a power density of 1 watt per square inch of display image area.

In known flat panel display systems, where ITO layers are coated on separate glass plates that are then laminated to the outside of the polarizer, the lamination process often results in layers that contain bubbles or particulates. Displays having bubble or particulate contamination are scrapped as unsatisfactory displays. Because the contamination is not detectable until the adhesive is dry and the display is fully assembled, a contaminated laminate layer results in the loss of an entire LCD assembly. Coating the ITO, with or without index matching layers, directly on the external front and rear surfaces of the LCD glass (i.e., plates) avoids this high yield loss.

Placing the index matching ITO layers directly on the plates also prevents the undesirable effects of lamination-induced window framing (LIWF). In known flat panel displays, the ITO layers are coated directly onto separate glass plates, which are typically then laminated permanently with optical adhesive to the external surfaces of the front and/or rear polarizer(s). Due to the shrinkage of the optical adhesive during its cure, and/or differential coefficients of thermal expansion (Cte) of the ITO cover glass(es), optical adhesive, polarizer and LCD glass, the LCD glass bends or bows, changing the cell gap between the front and rear glass plates of the LCD. This cell gap deformation locally changes the image contrast, typically causing "whitening" or "darkening" degradation of contrast around the edge or periphery of the display area (i.e., "halo" effect). This effect is known as LIWF. The severity of this degradation changes with the age and operating temperature of the display. By skipping the step of laminating ITO coated glass plates to the outside surface of the polarizer layer, LIWF is avoided.

Placing the index matching ITO layers directly on the plates also enhances optical performance. The present invention has a reduced specular reflection and increased contrast over known displays which have ITO coated glass plates laminated to the outside surface of the polarizers. By placing the front ITO layer under the front polarizer layer, less light is reflected from the display. In other words, because the front polarizer is transmitting only a portion of the light from the outside (e.g., 42% of the light is transmitted by the polarizer), a corresponding smaller amount of that transmitted light is reflected by the ITO layer between the polarizer and the front plate.

The ITO layers and the index matching dielectric layers of the present invention are applied using known manufacturing processes such as sputtering or vapor deposition.

Figure 3:
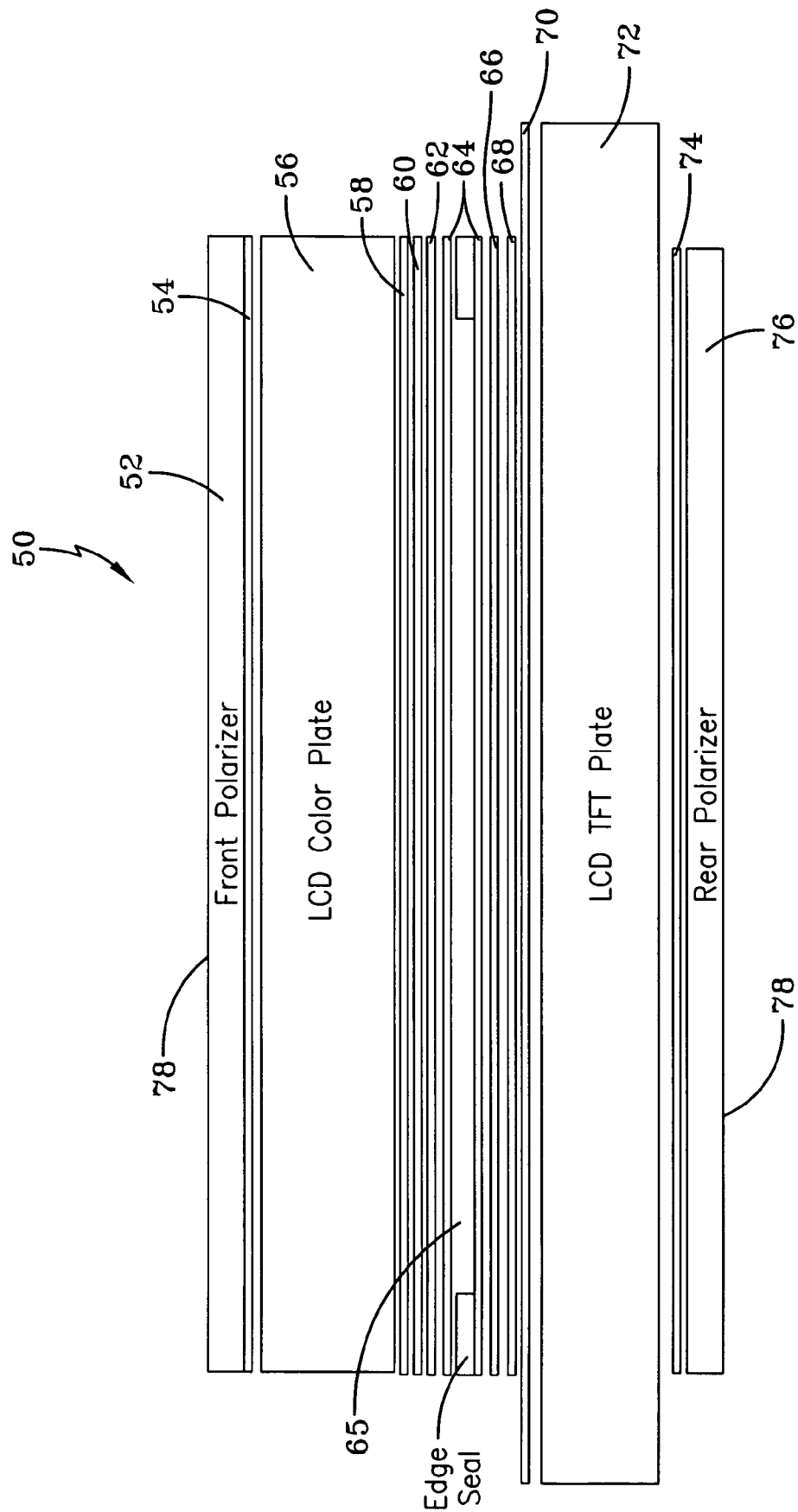
FIG. 3 illustrates an alternative embodiment of the flat panel display of the present invention.

FIG. 3 illustrates another embodiment of a flat panel display 50 of the present invention. In this embodiment, the display is preferably comprised of the following layers: a front polarizer 52, a pressure sensitive adhesive layer 54, an LCD color plate or glass layer 56, a black mask layer 58 (preferably chrome), a color filter layer 60, a Vcom ITO 62, a Polyamide Alignment Layer 64, a layer of liquid crystals 65, a TFT array layer 66, and insulator layer 68, an ITO heater layer 70, a LCD TFT plate or glass 72, a second pressure sensitive adhesive layer 74, a rear polarizer layer 76, and anti-reflective coating layers 78.

In the embodiment of FIG. 3, the ITO heater layer is preferably placed on the inside surface of the glass plate allowing the ITO heater layer to be closer to the liquid crystal layer. This reduces the thermal resistance between the ITO layer and the liquid crystal layer thus reducing the amount of power necessary to heat the liquid crystal layer. Furthermore, since there are fewer intervening layers between the ITO heater and the liquid crystal layer, less power is needed to heat the liquid crystal layer. Because of the lower power requirements for powering the ITO layer, the thickness of the electrical connectors may be reduced.

In the preferred embodiment of FIG. 3, bus bars are placed along predetermined edges of the ITO heater layer. The bus bars provide a low impedance connection along predetermined edges of the ITO heater layer. The bus bars allow for the uniform injection of current into the ITO heater layer. In one embodiment, silk screen epoxy is laid onto the ITO heater layer which is then placed in an oven and heated. Accordingly, the resulting bus bars become embedded into the ITO layer.

In this embodiment, it is preferred that the black mask layer, preferably comprised of chrome, be electrically tied to the zero potential chassis. Accordingly, the black mask layer acts as an EMI layer. In an alternate embodiment, index matching dielectric layers can be sandwiched around the ITO heater layer to provide the benefits discussed earlier. The insulator layer could also be used as an index matching dielectric layer. In one embodiment, the black mask layer is applied through known vapor deposition or sputtering techniques.

Figure 4:
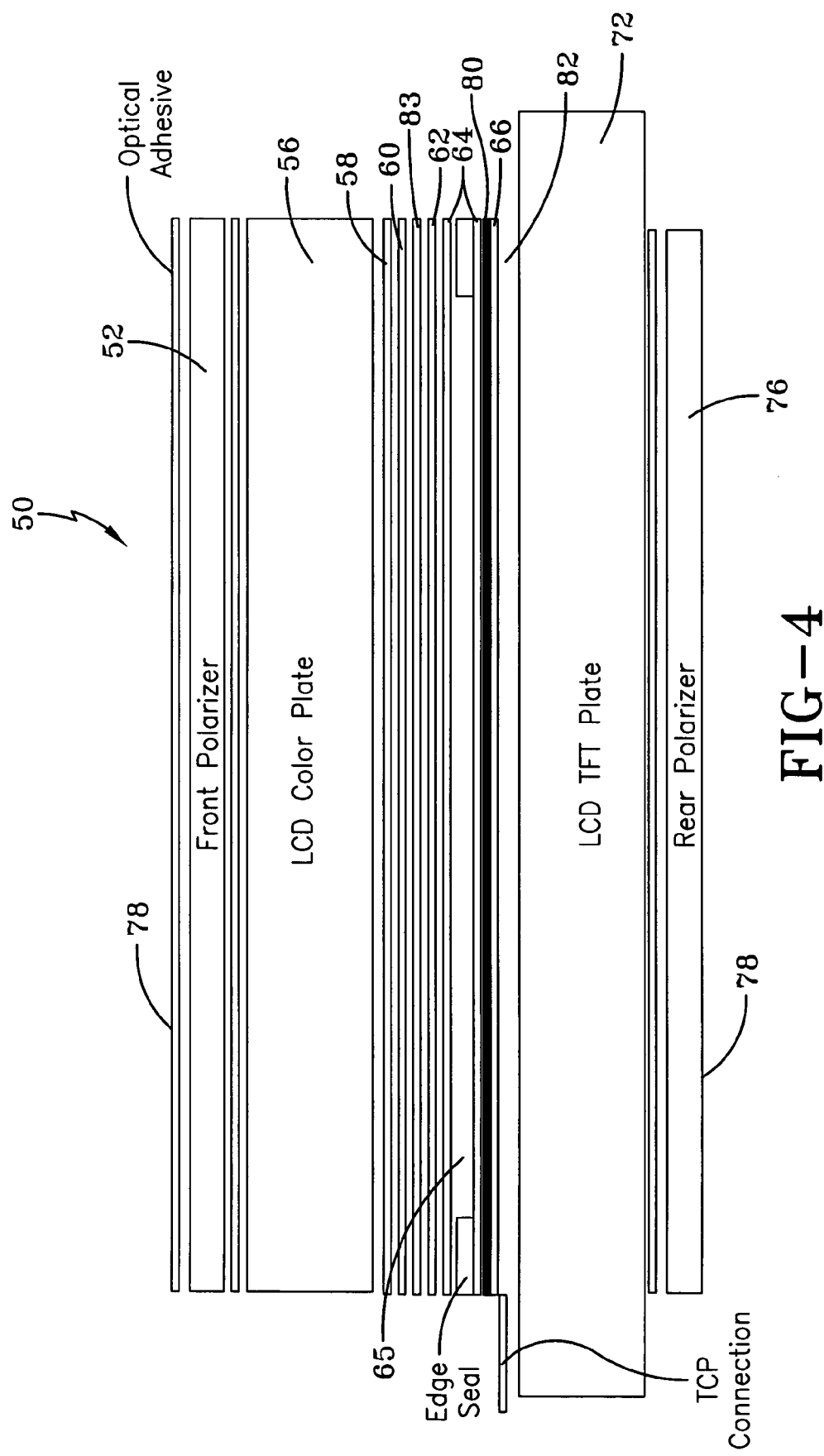
FIG. 4 illustrates an alternative embodiment of the flat panel display of the present invention.

FIG. 4 illustrates another alternative embodiment of the flat panel glass and display illustrated in FIG. 3. FIG. 4 is the preferred embodiment of the flat panel display of the present invention. In the preferred embodiment, the LCD is a TFT active matrix liquid crystal display (AMLCD) with source and gate drive flexible tape carrier package (TCP) connections 84. In the embodiment of FIG. 4, the heater layer 80 and thermal sensors (shown generally at 82) are integral to the flat panel display as they applied to the TFT array structure. The flat panel display of FIG. 4 avoids the high yield loss and LIWF issues of the prior art displays as previously discussed.

In the embodiment of FIG. 4, the LCD is comprised of a black mask EMI shield interposed between the front and rear glass plates. LCDs radiate EMI (radiated emissions) and are also susceptible to high strength EMI fields (radiated susceptibility). To guard against these EMI problems in sensitive environments (i.e., military applications, aircraft applications, etc.), an optically transmissive, low electrical resistance layer is used to cover the entire active area of the displayed image. Historical solutions have involved optically laminating or bonding a cover glass to the front of the LCD that has either been coated with an 8-20 ohm/square Indium Tin Oxide (ITO) layer or contains a low resistance black oxide wire mesh. The EMI shield absorbs and conducts the interference signal from the display. Using a cover glass is costly and electrical termination is labor intensive due to the use of electrically conductive bus bars and associated wire/foil leads. The use of cover glasses also creates optical problems because the ITO or wire mesh—reduces optical transmission and increases ambient light reflections that both contribute to reduced image luminance and contrast. To compensate for the reduced luminance and contrast higher intensity backlights are used which leads to greater system costs, higher display operating temperature (reduced life) and greater system power consumption (more increased system costs). Furthermore, with wire mesh, image moiré (i.e., optically distracting black and white moving pattern caused by optical interference between the mesh and pixel structures) can never be eliminated.

The black mask (BM) EMI shield of the present invention uses an existing structure within the LCD to perform an additional function. Other than the very low cost addition of an optically clear resin dielectric (insulating) layer 83 between the black mask and the Vcom ITO (already existing structures within the LCD) there are no items added to degrade the image quality. There is little to no reduction in LCD optical transmission, little to no reduction in image luminance, little to no increase in ambient light reflections, little to no degradation in image contrast, and no issues with EMI shield electrical termination (electrical termination is accomplished automatically with TCP and FPC ACF termination).

In the preferred embodiment of the black mask EMI shield, the gate, source, heater bus lines, pixel capacitors, and pixel feed-throughs are covered by low reflection, electrically conductive (e.g., greater or equal to 10.0 ohms/square feet) black mask when viewed from any angle, preferably over the entire viewing area. The black mask is preferably electrically isolated from the Vcom ITO. Electrical connection to the black mask is preferably accomplished through the source TCPs and through a flex printed circuit (FPC) across the display. In the preferred embodiment, the black mask shall extend to within 0.0 to 0.1 mm of the extreme edges of the rear face of the color plate on all four edges and the corner crops. The black mask is electrically connected to chassis ground.

Figure 5:
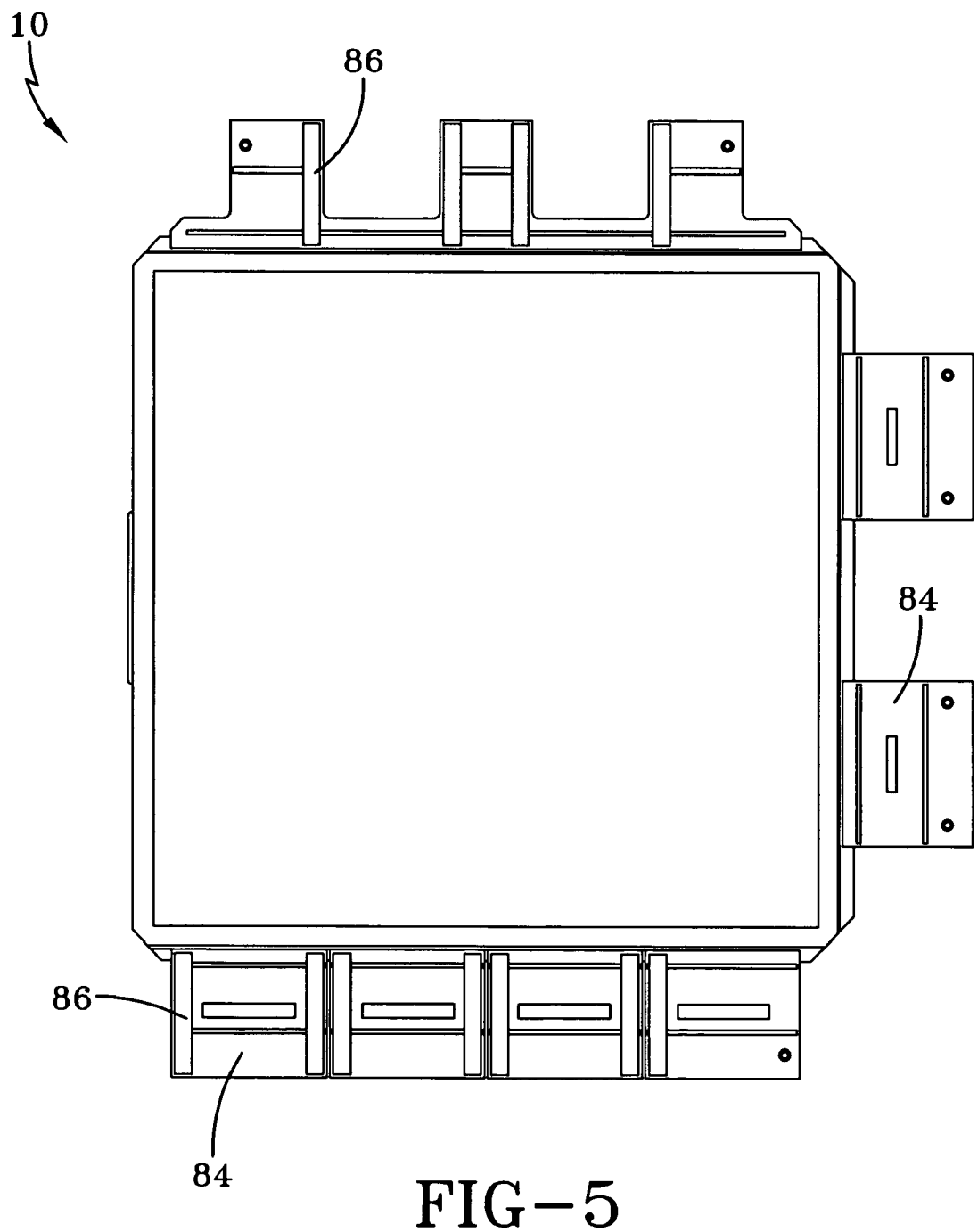
FIG. 5 illustrates a plan view of one example of a flat panel display of the present invention showing flexible TCP connections.
Figure 6:
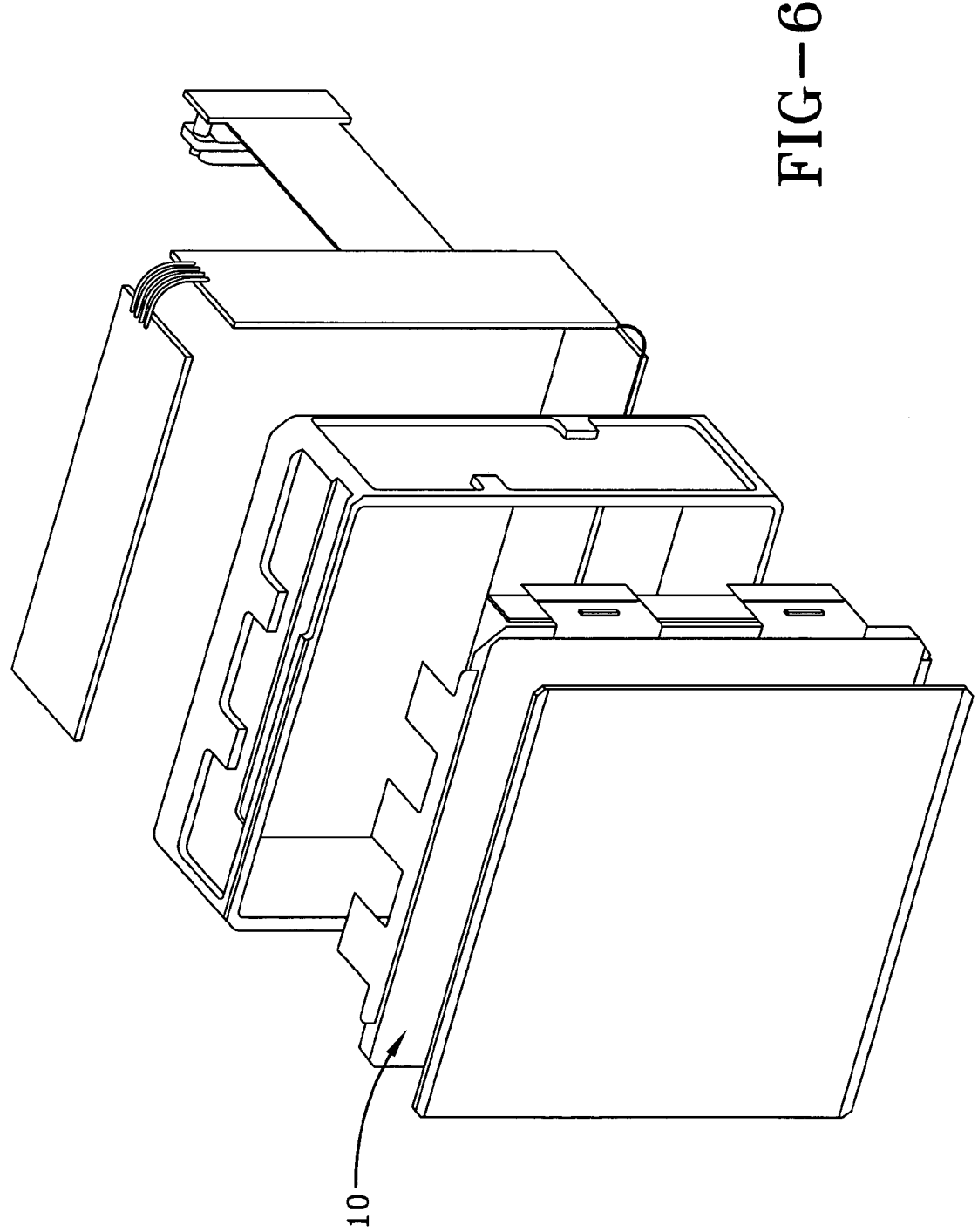
FIG. 6 illustrates a perspective blow-up view of one embodiment of a display incorporating the flat panel display of the present invention.

FIG. 5 illustrates one example embodiment of a flat panel display having flexible TCP connections. In this embodiment, heater channels: 4-60, 89-145, 174-230, 259-315 (total: 228 channels); black mask channels: 65-84, 150-169, 235-254 (total: 60 channels); dummy channels: 1-3, 61-64, 85-88, 146-149, 170-173, 231-234, 255-258, 316-318 (total: 30 channels) are used. The source and gate drive flexible tape carrier package (TCP) connections are shown at 84. The EMI bonding pads are illustrated at 86. FIG. 6 illustrates a perspective blow-up view of one embodiment of the flat panel display of the present invention illustrating the TCP connections.

Figure 7:
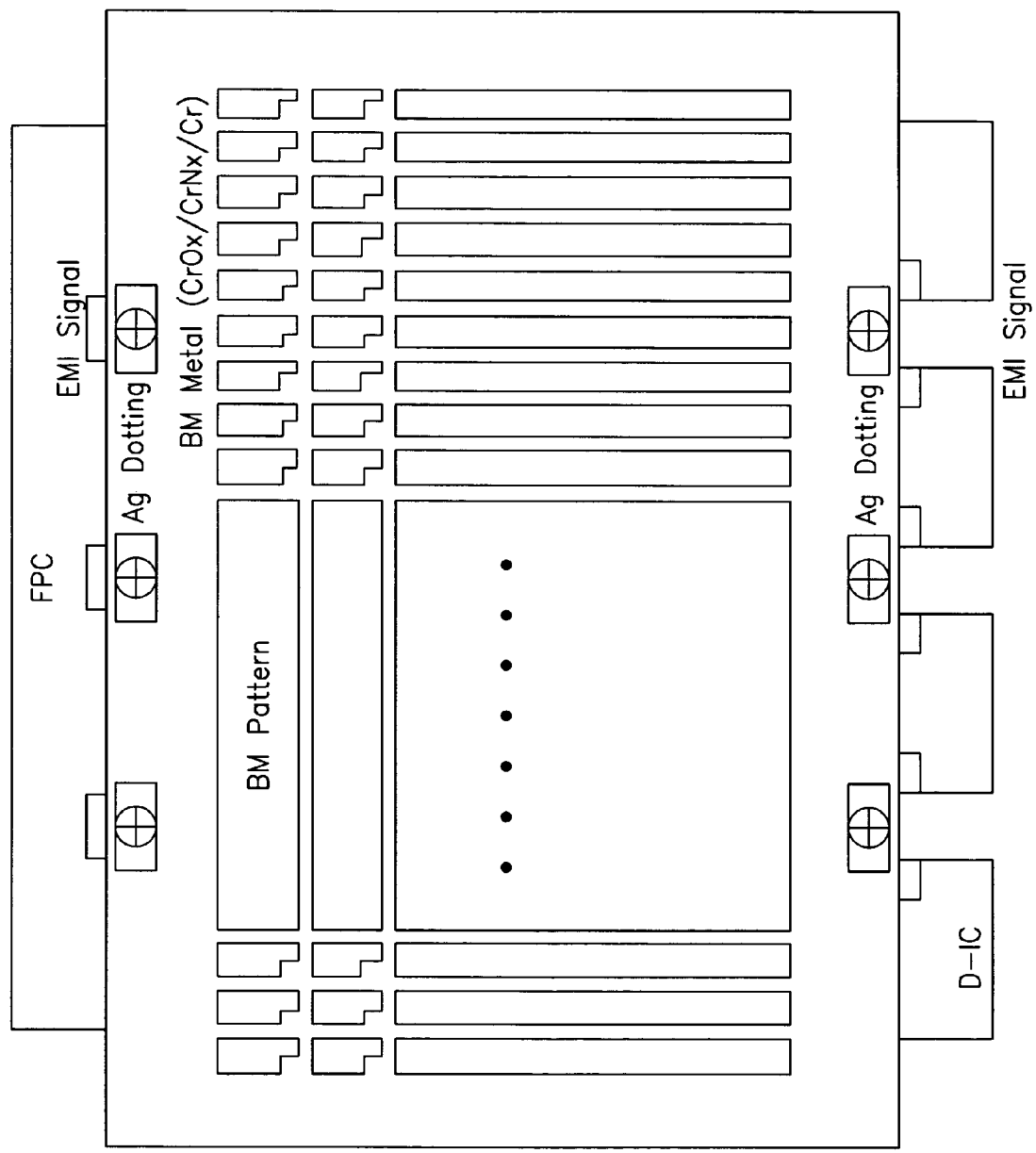
FIG. 7 illustrates a plan view of one embodiment of the black mask EMI shield layer of the present invention.

FIG. 7 illustrates a plan view of one embodiment of the black mask EMI shield layer of the present invention. It is preferred that the black mask resistivity be between 5 to 15 ohms per square. In one embodiment the black mask is comprised of a CrOx/CrNx/Cr, 350/350/1020A, layer.

In the embodiment of FIG. 4, an integral metal heater 80 (shown in black) is used instead of the ITO heater layer. In the preferred embodiment, the immediate front surface of the rear TFT plate is patterned with a metal heater. Because the heater layer is closer to the liquid crystal layer, thermal resistance is reduced between the heater and the liquid crystal layer thus reducing the amount of power necessary to heat the liquid crystal layer. Again, since there are fewer intervening layers between the heater and the liquid crystal layer, less power is needed to heat the liquid crystal layer.

Figure 8:
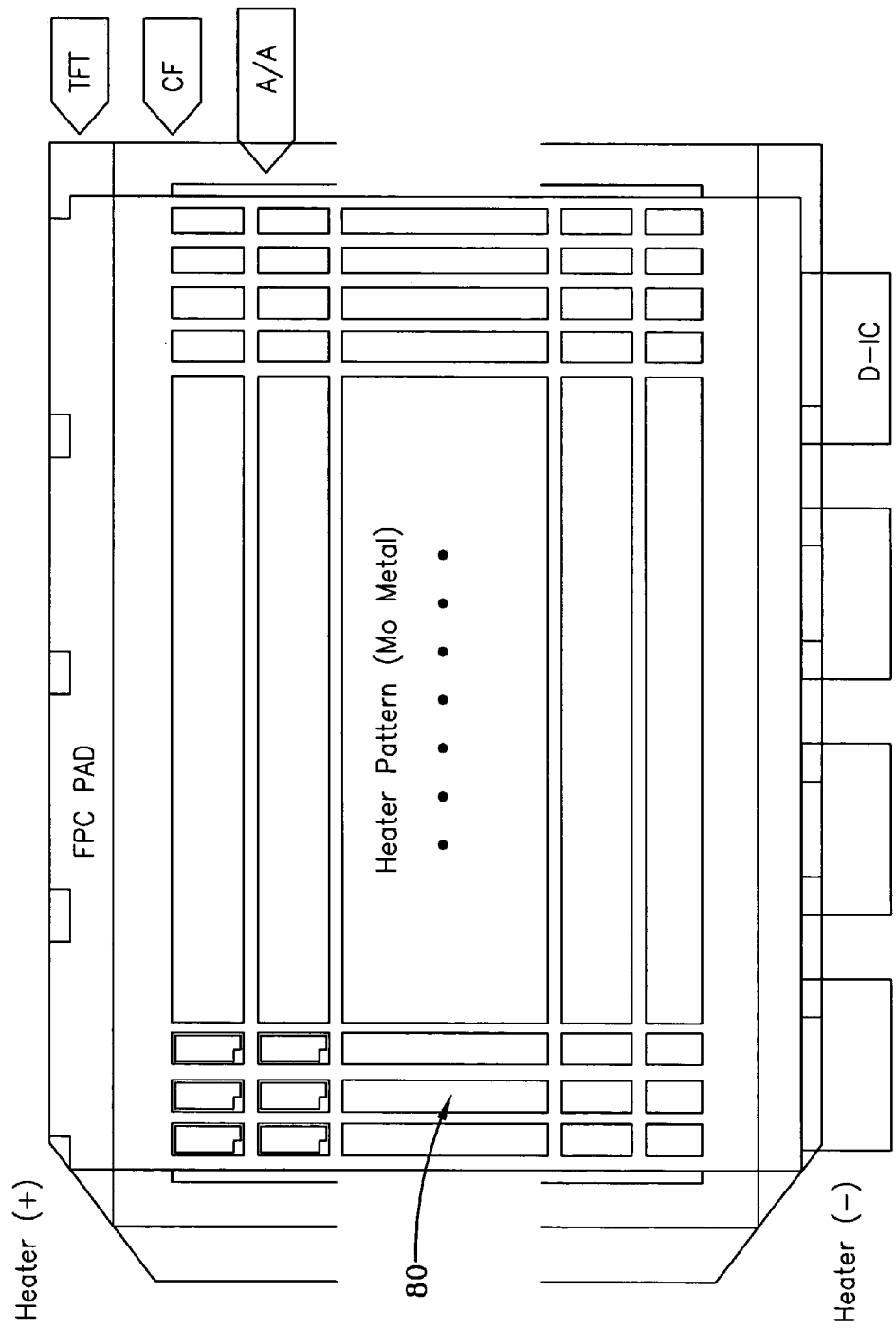
FIG. 8 illustrates a plan view of one embodiment of a metal heater layer of the present invention.

FIG. 8 illustrates a plan view of one embodiment of a metal heater layer of the present invention. It is preferred that the integral metal heater be placed behind the black mask EMI layer so that no portion of the heater is visible and no portion of the heater interferes with the pixel apertures. The LCD liquid crystal (LC) fluid is heated to preserve response time (i.e., prevent image smearing of rapid image movement) at lower display module temperatures (usually somewhere below 0 degrees C.). To accomplish this, historic solutions have involved optically laminating or bonding a cover glass to the front or rear of the LCD that is coated with an Indium Tin Oxide (ITO) layer whose electrical resistance is selected to produce a power dissipation of typically 2 watts/square inch of image area when the heater voltage is applied. This typical method is costly (e.g., the heater glass is expensive) and electrical termination is labor intensive (i.e., required electrically conductive bus bars and associated wire/foil leads). Furthermore, the typical heating technologies are prone to handling damage resulting in unusable LCDs. These historic heater technologies also created optical problems due to reduced optical transmission and increased ambient light reflections. Accordingly, these typical LCDs have reduced image luminance and contrast.

The integral metal heater of the present invention is comprised of structure within the LCD to perform the heater function. The integral metal heater is preferably made by two additional photolithography steps, which does increase the cost of the LCD cell, but to only a fraction of the cost of an external heater. The metal heater is preferably optically hidden under the black mask (BM). Therefore, there is little to no reduction in LCD optical transmission and image luminance, little to no increase in ambient light reflections, little to no degradation in image contrast, and no issues with heater electrical termination. Electrical termination is preferably accomplished automatically with known TCP and anisotropic conductive film (ACF) termination. The TCP connection between the LCD and display electronics is advantageous as it provides a flexible connection and requires less contact area on the glass.

Preferably, the heater pattern is comprised of a horizontal and vertical grid of controlled resistance heater conductors, with low resistance horizontal "heater +" bus bar at the top of the vertical grid (e.g., preferably less than or equal to 0.5 ohms) and a low resistance "heater –" bus bar at the bottom of the vertical grid. It is preferred that all portions of the heater grid be outside of the active pixel aperture and hidden from view under the black mask. The heater grid pattern is preferably chosen to minimize capacitive coupling between the heater grid and the gate and source bus lines. In the preferred embodiment, there are heater grid lines under each horizontal and vertical leg of the black mask.

Preferably, the heater grid is over-coated with an insulating dielectric having a breakdown potential of over 100 volts DC. Connections to the heater – (i.e., the bottom bus adjacent to the source TCPs) are preferably routed to associated traces on the source TCPs. Heater – is preferably connected, in the source PCB, to ground potential. Connections to the heater + (i.e., top bus bar or the bar on the edge opposite the source TCPs) are preferably routed to pads on the exposed areas of the front side of the rear glass (i.e., TFT plate) for ACF connection to the heater and black mask EMI FPC. During heater operation, heater + is preferably connected to 28 VDC through the heater and black mask EMI FPC. When the heater is not operating, the heater + connection is preferably connected to heater – and ground.

Figure 9:
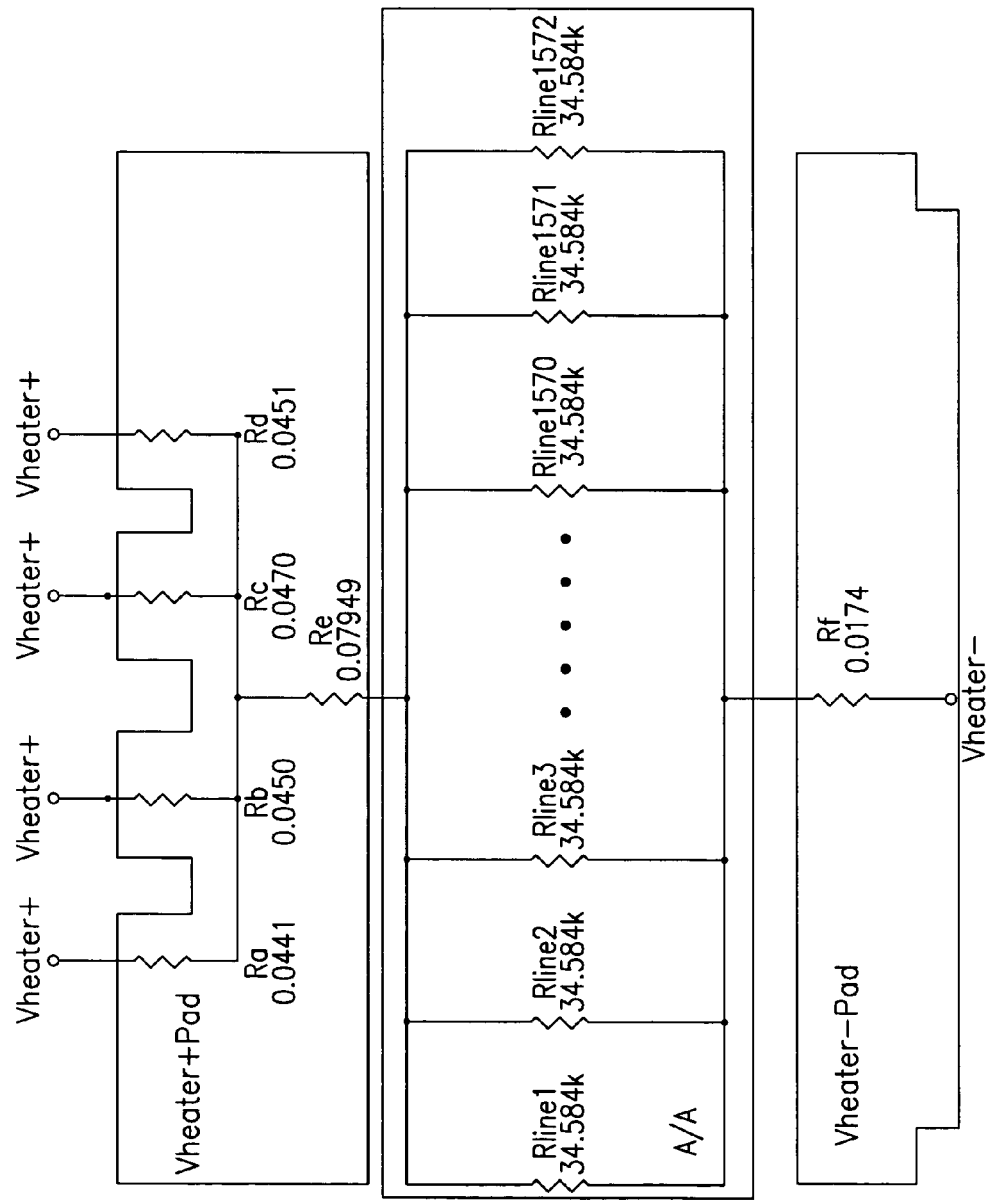
FIG. 9 illustrates one example embodiment of a heater circuit of the present invention.

In the preferred embodiment, all features of the patterned heater, including the heater + and heater – bars are covered by the black mask in the assembled LCD cell so that no heater pattern or heater bus bar features are visible in the display image. FIG. 9 illustrates one example embodiment of a heater circuit of the present invention.

Figure 10A:
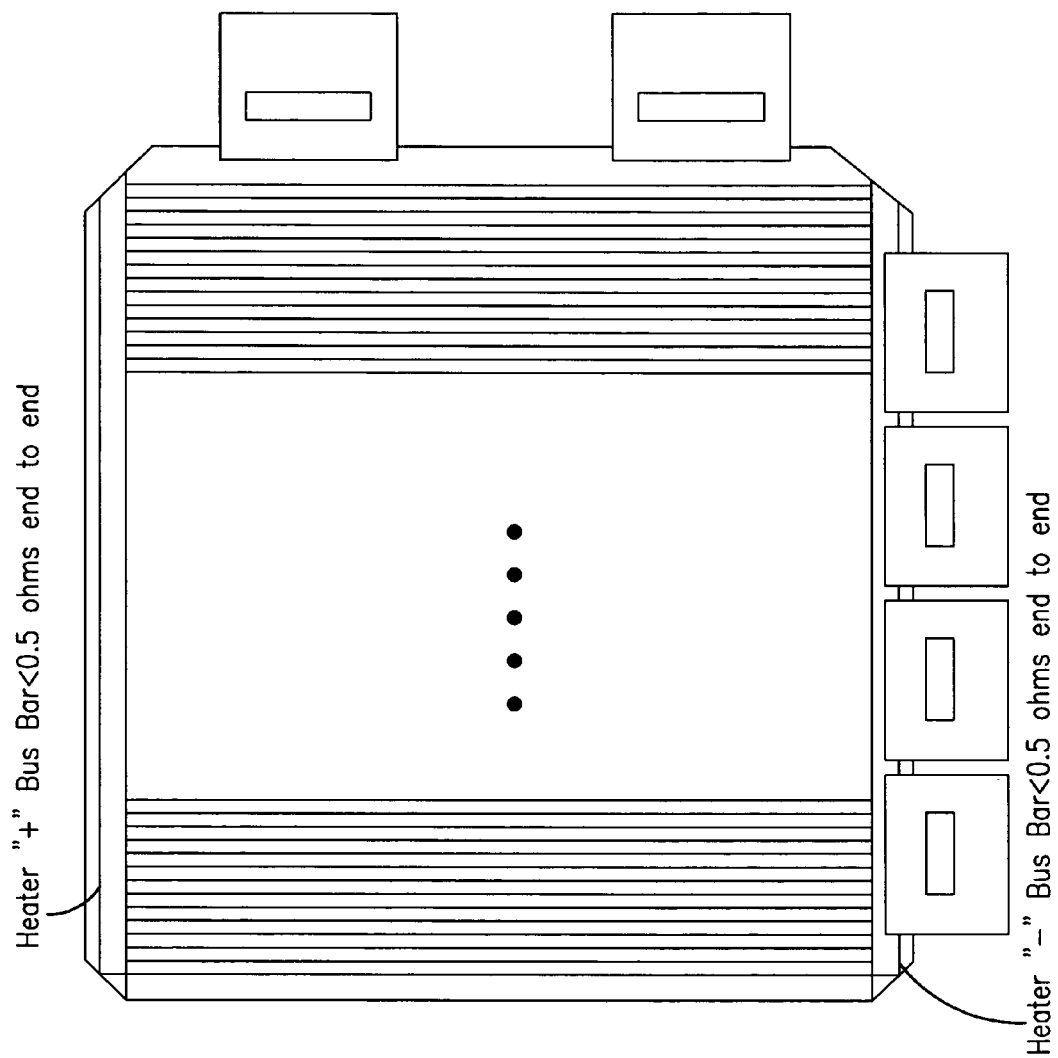
FIGS. 10A-B illustrate other integral heater designs.
Figure 10B:
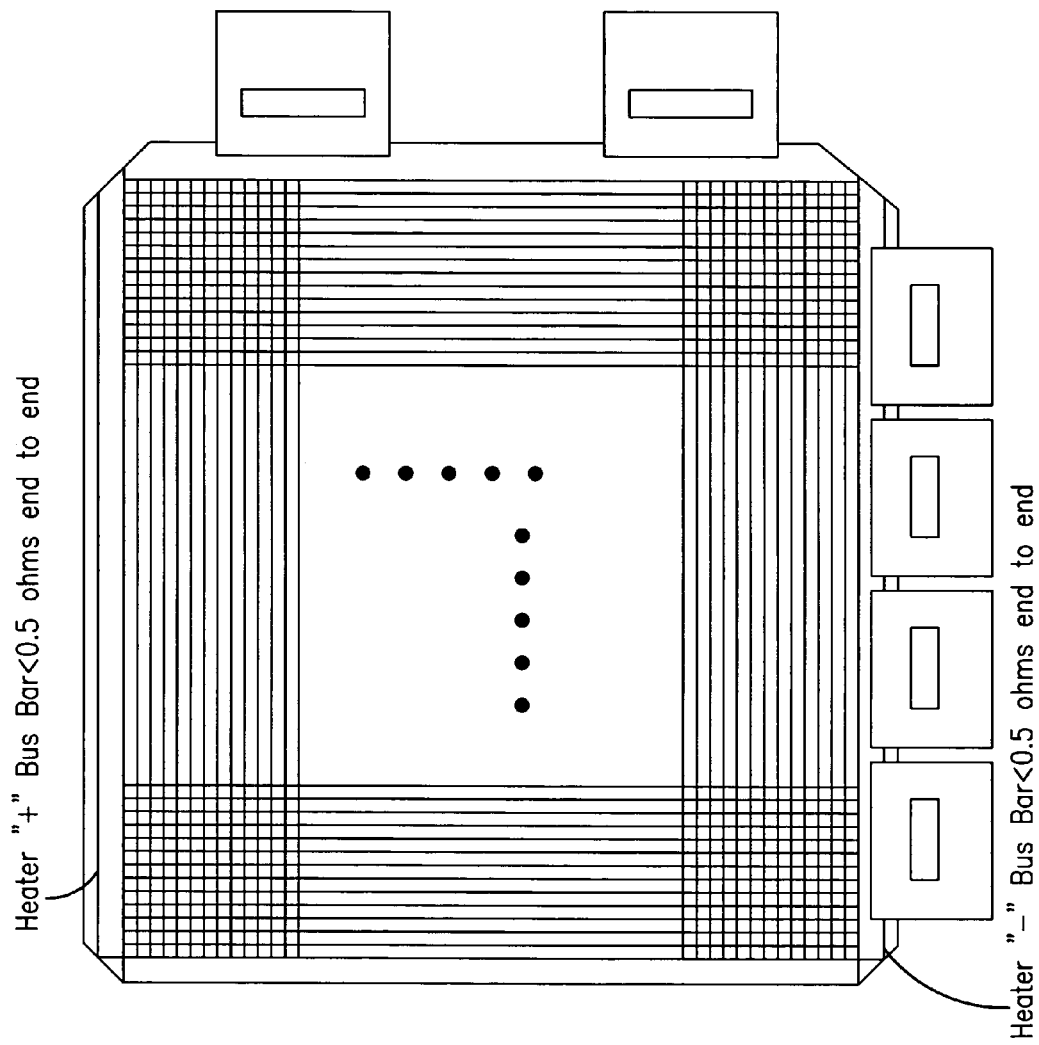

FIGS. 10A-B illustrate other integral heater designs. FIG. 10A illustrates a vertical parallel heater design. In this embodiment, the heater conductors preferably lie directly under source bus lines. The heater lines are preferably narrower than the bus lines and do not intrude into the sub-pixel apertures. This minimizes capacitive coupling to the pixel capacitor and eliminates reduction in panel transmission by the heater. FIG. 10B illustrates the preferred grid design having 525 horizontal and 525 vertical lines. In this embodiment, the heater conductors preferably directly under source and gate bus lines and are narrower than the bus lines and do not intrude into the sub-pixel apertures. In alternate embodiments, the number of horizontal and vertical heater lines may vary. For example, the heater grid pattern may be 525 horizontal and 1,573 vertical lines; 525 horizontal and 787 vertical lines; or 768 half-width horizontal lines and 1,536 vertical lines.

Figure 11:
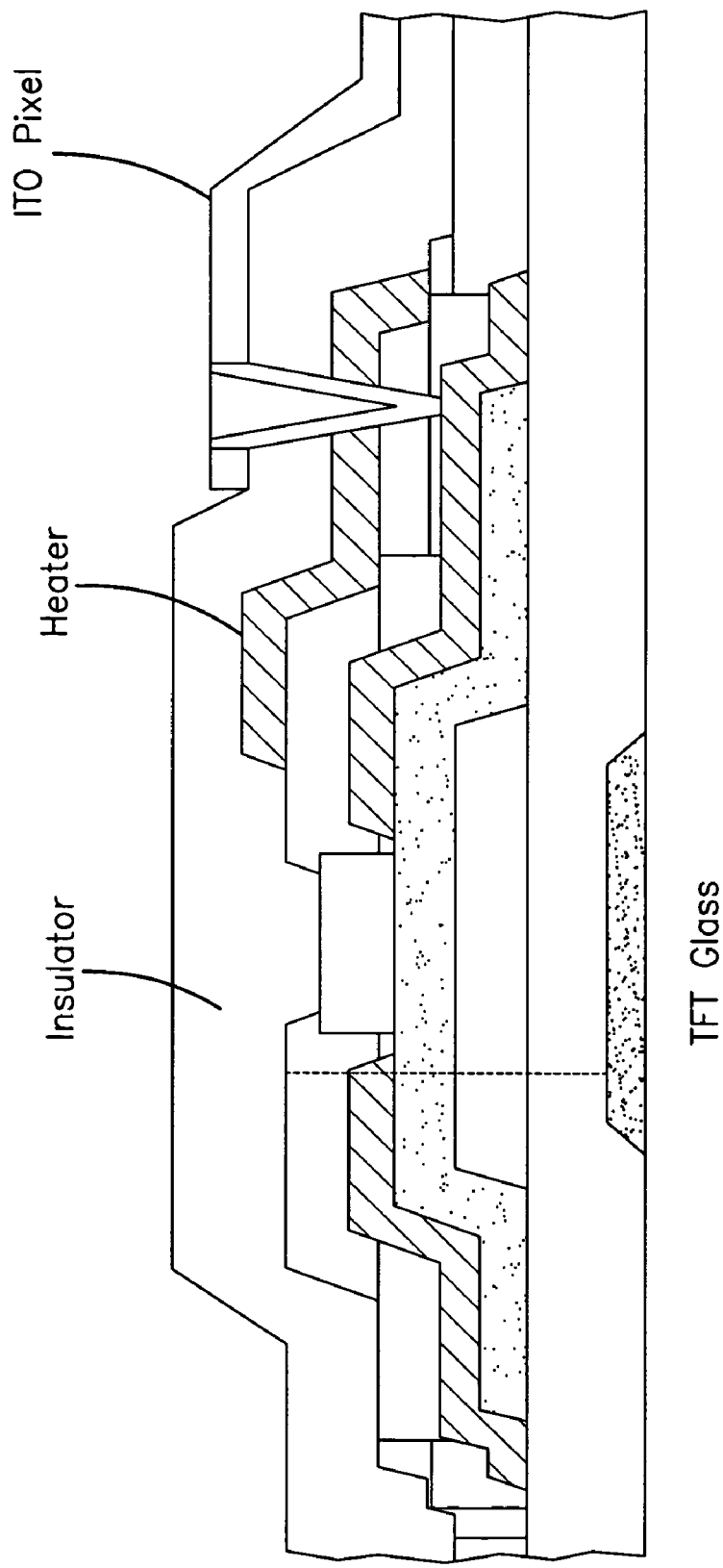
FIG. 11 illustrates one embodiment of a TFT design of the present invention with integral heater.

As discussed, the integral metal heater of the present invention is applied by known bus metalization techniques. FIG. 11 illustrates one embodiment of a TFT design of the present invention with integral heater.

As shown in the embodiment illustrated in FIG. 4, it is also preferred that thermal sensors 82 be placed on the inside portion of the glass plates. Preferably, the sensors are in close proximity to the heater layer to detect the heat being inputted into the liquid crystal layer so as to provide timely feedback to the system. The integral thermal sensors are also applied onto the TFT array layer preferably under the black mask EMI layer. In this embodiment, thermal resistivity is reduced leading to faster response times.

The integral thermal sensor of the present invention provides an efficient, low cost solution as there is no separate thermal sensor component that must be purchased. Furthermore, there is no process time or labor required to attach a thermal sensor to the LCD or to attach thermal sensor wires to a circuit. With the integral thermal sensor, signal attachment automatically occurs with ACF attachment of the TCP attachment. The intimate contact between sensor and LCD fluid provides higher accuracy and reduced time lag between actual fluid temperature and thermal sensor readings.

Figure 12:
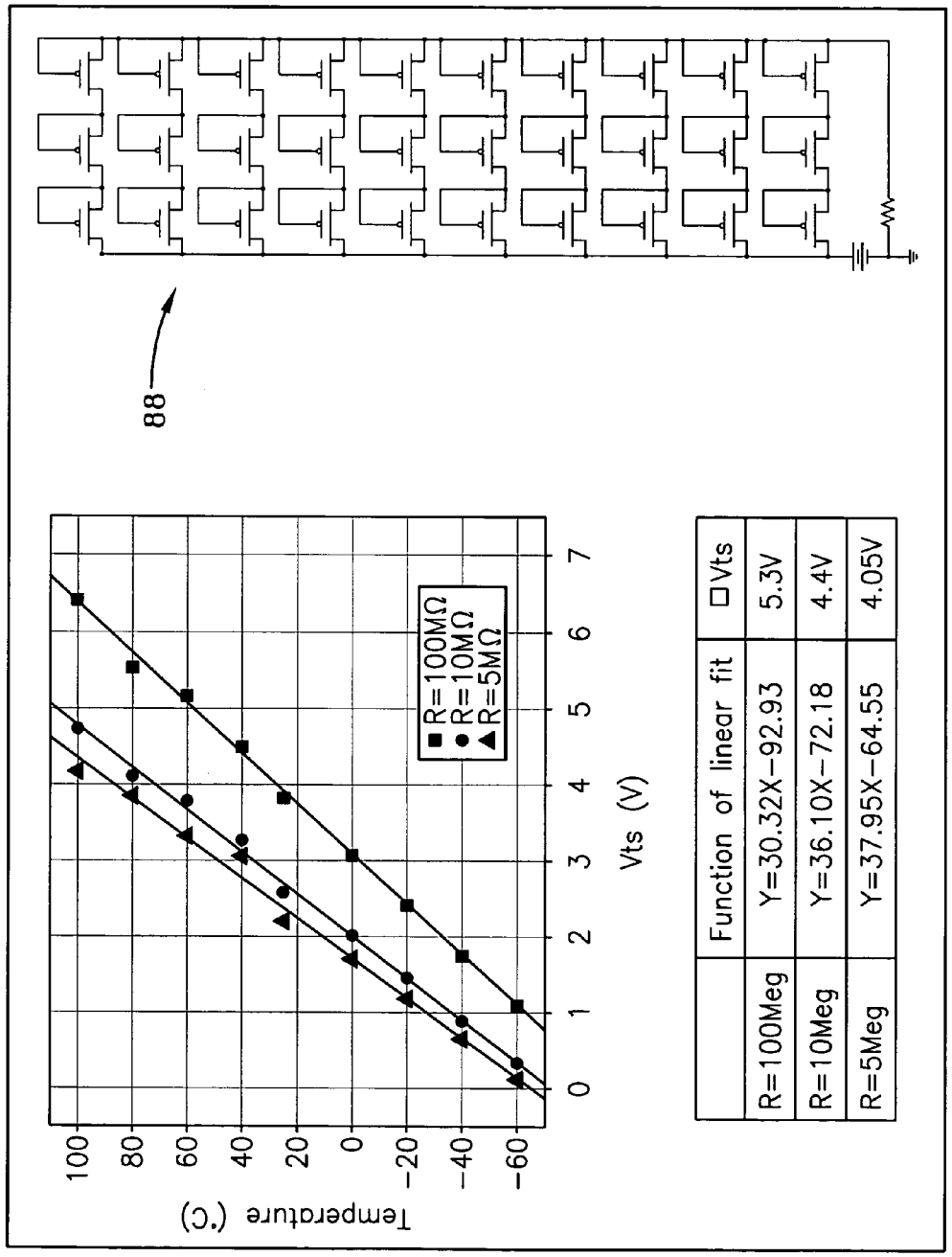
FIG. 12 illustrates one embodiment of a diode array of the present invention.

In the preferred embodiment, a series/parallel array of diodes is embedded within the TFT array to sense the temperature of the LC fluid. FIG. 12 illustrates one embodiment of a diode array 88 of the present invention. In this embodiment, the thermal sensors are comprised of a diode array (e.g., 3 in series, 10 parallel) built into the TFT array layer.

The anodes of the top array are preferably connected to a common node and brought out of the source TCP as "Thermal Sensor +". The cathodes at the bottom of the diode array are preferably connected to common node and brought out of the source TCP as "Thermal Sensor –".

The number of diodes in each array may vary, however in the preferred embodiment, the number of diodes shall be selected to provide a nominal 2.5V to 5.0V change in the diode string forward bias potential as the LC fluid changes from –60 degrees C. to +100 degrees C.

Figure 13:
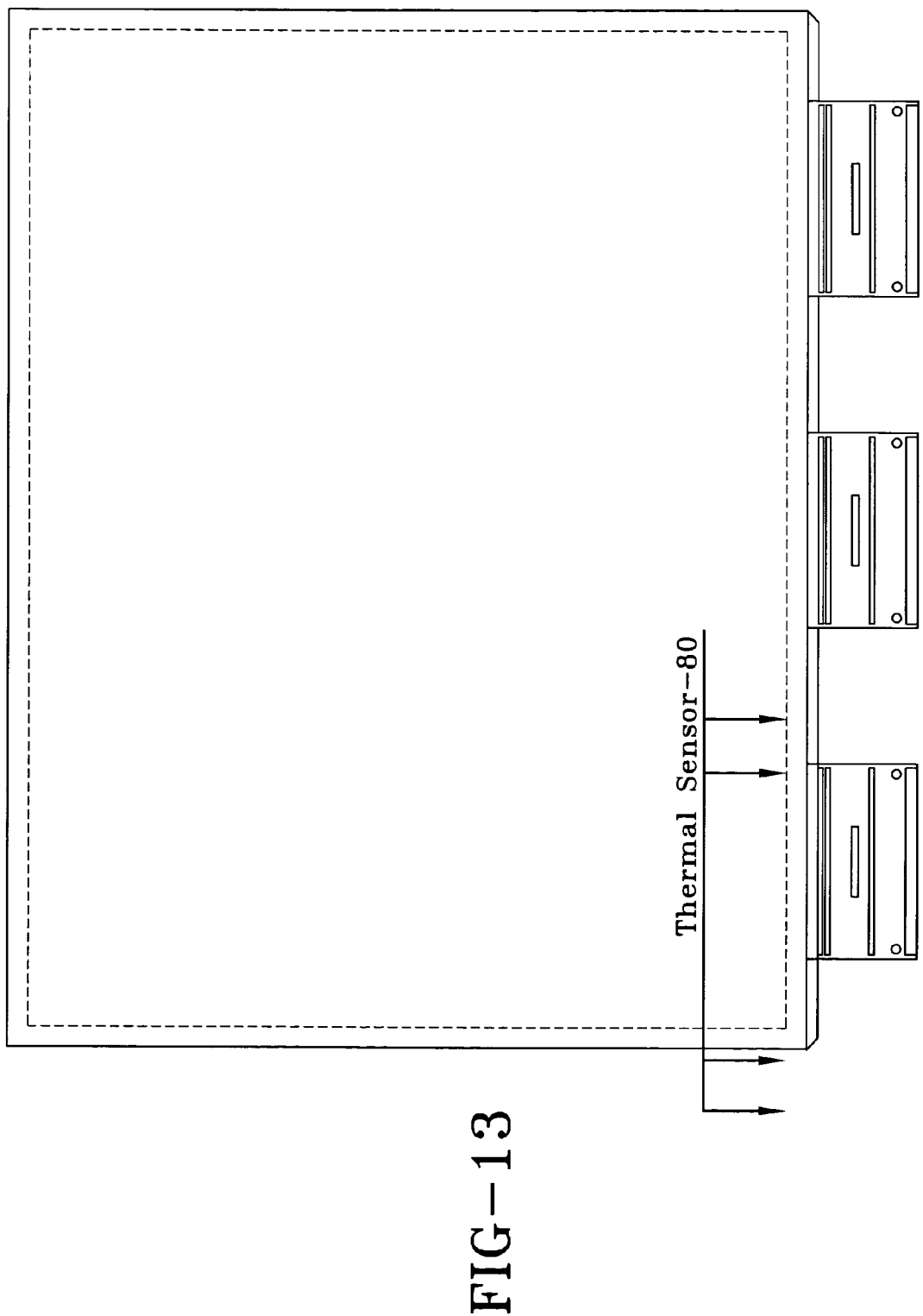
FIG. 13 illustrates a plan view of a flat panel display showing thermal sensor placement.

In the preferred embodiment, a thermal sensor diode array according to the present invention is located and electrically connected between each source TCP. For example, if there are four TCPs there will be three thermal sensor diode arrays. FIG. 13 illustrates a plan view of a flat panel display showing thermal sensor placement.

Figure 14:
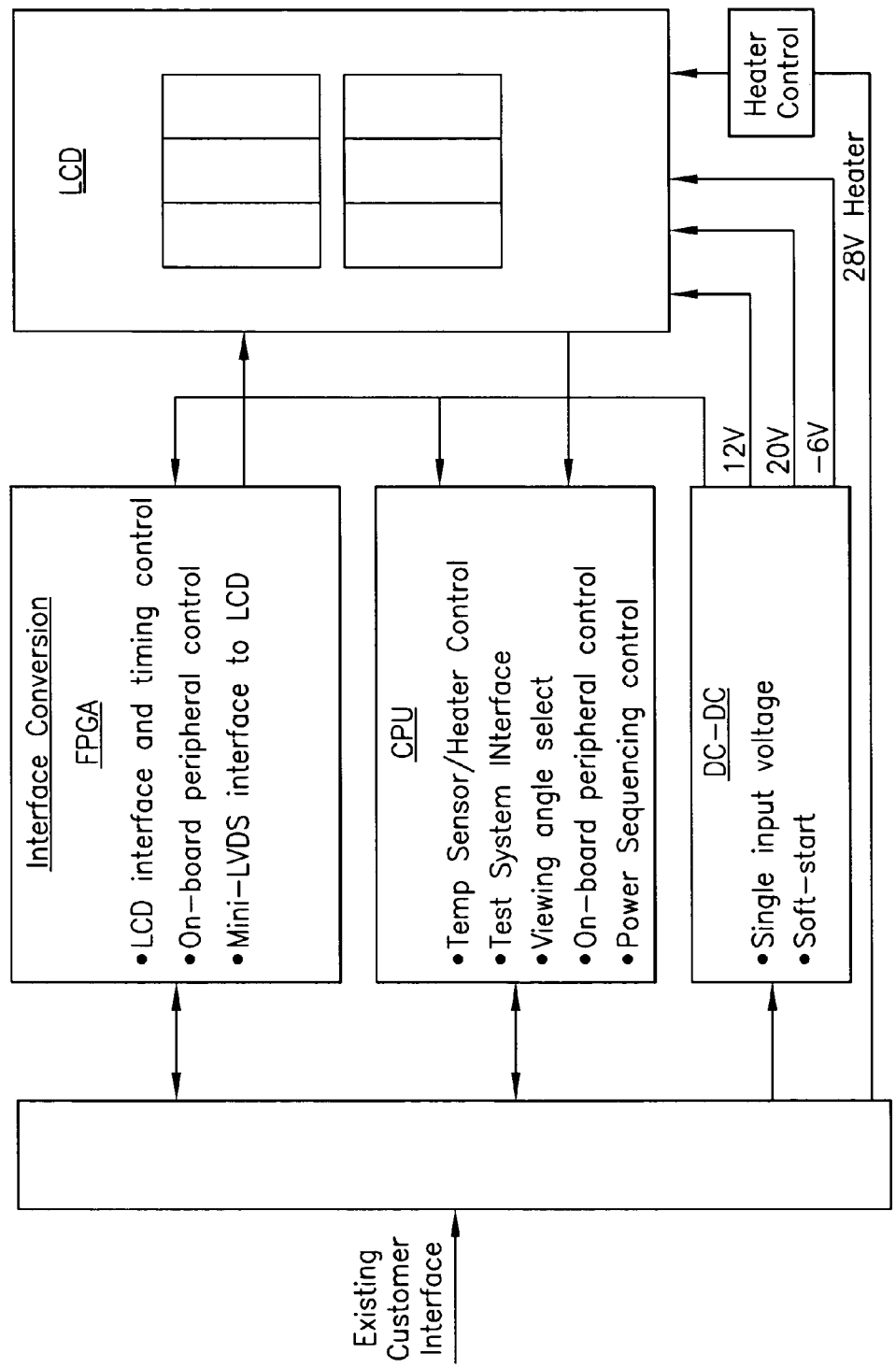
FIG. 14 illustrates an example block diagram of the electrical components and connections of a display incorporating the flat panel display of the present invention.
Figure 15:
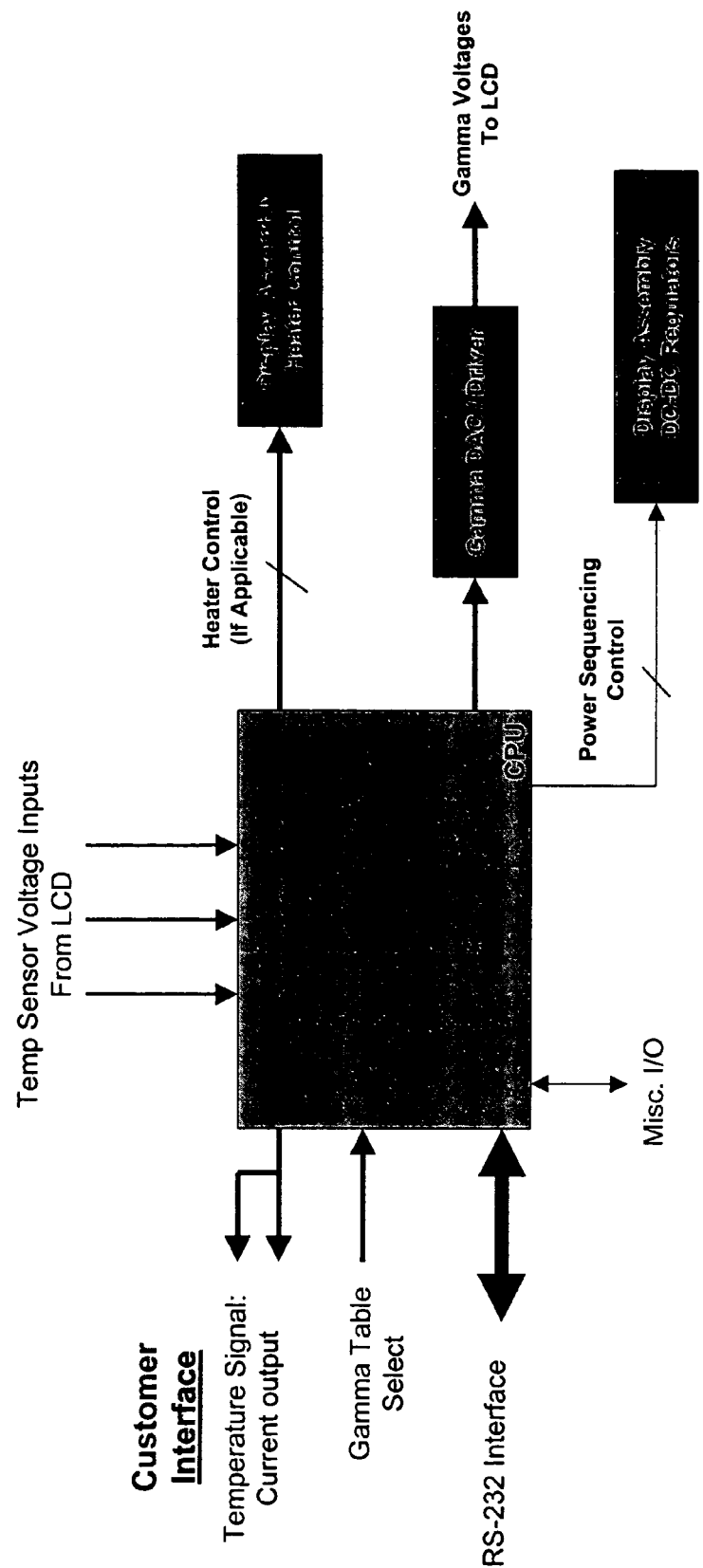
FIG. 15 illustrates an example CPU interface of a display incorporating the flat panel display of the present invention.

FIG. 14 illustrates an example block diagram of the electrical components and connections of a display incorporating the flat panel display of the present invention. FIG. 15 illustrates an example CPU interface of a display incorporating the flat panel display of the present invention.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A flat panel display comprising:
    a front glass plate;
    a rear glass plate;
    a layer of liquid crystals interposed between said front and rear glass plates;
    a TFT array layer interposed between said front and rear glass plates; and
    a metal heater layer integral to said TFT array layer.

2. A flat panel display according to claim 1, wherein said metal heater layer is patterned onto said TFT array layer.

3. A flat panel display according to claim 1, where said metal heater layer is comprised of a grid of intersecting horizontal and vertical lines.

4. A flat panel display according to claim 1, further comprising:
a black mask EMI layer interposed between said front and rear glass plates and wherein said black mask EMI layer is electrically tied to zero potential and isolated from Vcom.

5. The flat panel display of claim 4, further comprising:
an insulating dielectric layer interposed between the inside surfaces of said front and rear glass plates.

6. The flat panel display of claim 4, wherein said metal heater layer is patterned onto said TFT array layer.

7. The flat panel display of claim 4, wherein said metal heater layer is behind said black mask EMI layer.

8. The flat panel display of claim 4, wherein said metal heater layer comprises a grid of intersecting horizontal and vertical lines.

9. The flat panel display of claim 4, further comprising an insulating dielectric over-coated onto said metal heater layer.

10. The flat panel display of claim 4, further comprising:
at least one thermal sensor integral to said TFT array layer.

11. The flat panel display of claim 10, wherein each said thermal sensor comprises of an array of diodes.

12. The flat panel display of claim 1, further comprising:
at least one thermal sensor integral to said TFT array layer.

13. The flat panel display of claim 12, wherein said at least one thermal sensor is applied onto said TFT array layer.

14. The flat panel display of claim 12, wherein each said at least one thermal sensor comprises an array of diodes.

* * * * *